United States Patent
Abramau

(10) Patent No.: US 9,298,432 B1
(45) Date of Patent: Mar. 29, 2016

(54) SYSTEMS AND METHODS FOR PERFORMING HOOKING IN A JITTED ENVIRONMENT

(71) Applicant: STEALTHbits Technologies, Inc., Hawthorne, NJ (US)

(72) Inventor: Mikalaj Abramau, Minsk (BY)

(73) Assignee: STEALTHbits Technologies, Inc., Hawthorne, NJ (US)

( * ) Notice: Subject to any disclaimer, the term of this patent is extended or adjusted under 35 U.S.C. 154(b) by 0 days.

(21) Appl. No.: 14/656,507

(22) Filed: Mar. 12, 2015

(51) Int. Cl.
    *G06F 9/45* (2006.01)
(52) U.S. Cl.
    CPC .................. *G06F 8/41* (2013.01)
(58) Field of Classification Search
    CPC .................. G06F 8/41; G06F 8/447
    USPC .................. 717/140–149
    See application file for complete search history.

(56) References Cited

U.S. PATENT DOCUMENTS

| | | | | |
|---|---|---|---|---|
| 7,150,008 | B2 * | 12/2006 | Cwalina et al. | 717/126 |
| 7,219,329 | B2 * | 5/2007 | Meijer et al. | 717/106 |
| 7,823,201 | B1 | 10/2010 | Xu | |
| 7,890,939 | B2 * | 2/2011 | Kulkarni et al. | 717/143 |
| 2012/0304160 | A1 | 11/2012 | Soeder | |

OTHER PUBLICATIONS

Wang, Jerry, ".NET CLR Injection: Modify IL Code during Runtime," www.codeproject.com/Articles/463508/NET-CLR-Injection-Modify-IL-Code-during-Run-time, Aug. 7, 2014.
Mikunov, Aleksandr, "Rewrite MSIL Code on the Fly with the .NET Framework Profiling API," https://msdn.microsoft.com/en-us/magazine/cc188743.aspx, Sep. 2003.
Microsoft, "Metadata (Unmanaged API Reference)," https://msdn.microsoft.com/en-us/library/ms404384.aspx, Nov. 21, 2013.
Microsoft, "Profiling Overview, .NET Framework 4.5," https://msdn.microsoft.com/en-us/library/bb384493.aspx, Nov. 14, 2011.
Microsoft, "Reflection in the .NET Framework," https://msdn.microsoft.com/en-us/library/f7ykdhsy.aspx, Oct. 2, 2011.

* cited by examiner

*Primary Examiner* — Ted T Vo
(74) *Attorney, Agent, or Firm* — Austin Rapp & Hardman

(57) ABSTRACT

A computing device configured for replacing a target method in intermediate language code is described. The computing device includes a processor. The computing device also includes memory in electronic communication with the processor. The computing device further includes instructions stored in the memory. The instructions are executable to import a hook method and hook type into a caller method module. The instructions are also executable to replace, in intermediate language code, any call to the target method in a caller method body with a call to the hook method. The instructions are further executable to compile the intermediate language code to assembly language code. The instructions are additionally executable to call the hook method in place of the target method.

16 Claims, 19 Drawing Sheets

| Hook Class 534 | |
|---|---|
| Caller Binding Properties 536 | Hook Method Properties 538 |
| Caller Method Properties 540 | Target Binding Properties 542 |
| Caller Method Name Properties 544 | Target Method Properties 546 |
| Caller Parameters Properties 548 | Target Method Name Properties 550 |
| Caller Type Properties 552 | Target Parameters Properties 554 |
| Caller Type Name Properties 556 | Target Type Properties 558 |
| Hooked Properties 560 | Target Type Name Properties 562 |
| Inject Method 564 | Remove Method 566 |

FIG. 5

SYSTEMS AND METHODS FOR PERFORMING HOOKING IN A JITTED ENVIRONMENT

TECHNICAL FIELD

The present disclosure relates generally to computers and computer-related technology. More specifically, the present disclosure relates to systems and methods for performing hooking in a JITTED environment.

BACKGROUND

The use of electronic devices has become an everyday use in modern society. The use of electronic devices has increased as the cost of electronic devices has declined. The capabilities of electronic devices have also increased and allow people to use electronic devices in many different industries and for many different purposes. For example, electronic devices may be used to perform tasks at home, work or school. One type of an electronic device is a computer.

The technology being used in computers has been improving rapidly. Computers may range from small hand-held computing devices to desktop computer systems to large multi-processor computer systems. In order to use a computer, software is designed and saved in a computer's memory. The software may be used to access applications stored on the computer or may include the applications themselves. These pieces of software allow the computer to become a tool capable of performing tasks requested of a user. For example, a computer may include an application that allows users to communicate via e-mail or perform other tasks for users.

In some instances, a user may want more features and/or functions than an application provides. Without access to the source code, however, a user may be unable to add more features and/or functionality to an application. As can be observed from this discussion, systems and methods that improve application modifiability may be beneficial.

BRIEF DESCRIPTION OF THE DRAWINGS

FIG. 5 is a block diagram illustrating one example of a hook class;

DETAILED DESCRIPTION

A computing device configured for replacing a target method in intermediate language code is described. The computing device includes a processor. The computing device also includes memory in electronic communication with the processor. The computing device further includes instructions stored in the memory. The instructions are executable to import a hook method and hook type into a caller method module. The instructions are also executable to replace, in intermediate language code, any call to the target method in a caller method body with a call to the hook method. The instructions are further executable to compile the intermediate language code to assembly language code. The instructions are additionally executable to call the hook method in place of the target method.

The hook method may call the target method. The instructions may be executable to obtain a caller method module token, a target method module token and a hook method module token. The instructions may be executable to obtain a caller method type token, a target method type token and a hook method type token. Compiling the intermediate language code may include recompiling the intermediate language code by a just in time (JIT) compiler. The intermediate language code may originate from a Microsoft .NET managed environment. The target method may be a Microsoft Exchange method.

A method for replacing a target method in intermediate language code is also described. A hook method and a hook type are imported into a caller method module. Any call to the target method in a caller method body is replaced, in intermediate language code, with a call to the hook method. The intermediate language code is compiled to assembly language code. The hook method is called in place of the target method.

A non-transitory, tangible computer-readable medium for replacing a target method in intermediate language code is also described. The computer-readable medium includes executable instructions. The instructions are executable to import a hook method and hook type into a caller method module. The instructions are also executable to replace, in intermediate language code, any call to the target method in a caller method body with a call to the hook method. The instructions are further executable to compile the intermediate language code to assembly language code. The instructions are additionally executable to call the hook method in place of the target method.

Figure 1:
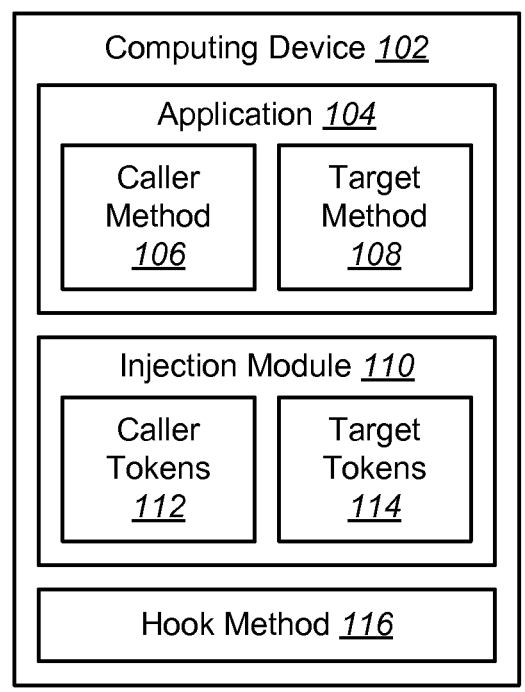
FIG. 1 is a block diagram illustrating one configuration of a computing device in which systems and methods for performing hooking may be implemented.

FIG. 1 is a block diagram illustrating one configuration of a computing device in which systems and methods for performing hooking may be implemented. In particular, the systems and methods disclosed herein may allow performing hooking in a "JITTED" (e.g., .NET) environment. For example, the systems and methods disclosed herein may enable hooking intermediate language code (rather than pure binary machine code, for instance). A "JITTED" environment is an environment that utilizes "just in time" compilation (e.g., where source code is translated to intermediate language code, which may be compiled "just in time" to assembly or machine language code). Other approaches may provide hooking of pure binary machine code. The computing device 102 may inject a hook method 116 into one or more target methods 108 located within an application 104. The computing device may inject the hook method 116 based on one or more caller tokens 112 and target tokens 114. The computing device may include an injection module 110 that utilizes the caller tokens 112 and target tokens 114 to perform hooking. In accordance with the systems and methods disclosed herein, hooking may include importing a hook method 116 and hook type into a caller method module. Hooking may also include replacing, in intermediate language code, any call to the target method 108 in a caller method 106 body with a call to the hook method 116. Specifically, the hook method 116 may be a function that is to be performed in place of the target method 108, in conjunction with performing the target method 108, or after the target method 108 is performed. The caller tokens 112 may include one or more caller type tokens and/or caller method 106 tokens. The target tokens 114 may include one or more target type tokens and/or target method 108 tokens. Tokens are discussed in further detail relation to FIG. 8 below.

The hook method 116 may be a method that replaces a target method 108. For example, a hook method 116 may replace the functionality of a target method 108 with the functionality of the hook method 116. For instance, the hook method 116 may be called by the application 104 instead of the target method 108. In some configurations, the hook method 116 may collect or manipulate data within the application 104. In one specific example, the application 104 may be an email application that allows multiple users to utilize email for on a single account. However, the email application may not provide for tracking of certain user activity. In this example, a hook method 116 may be injected into the application 104 to allow for tracking user activity. For instance, the hook method 116 may perform a security verification to ensure a user has proper security credentials to access certain data or to perform certain operations with the application 104.

In a known approach, hooks are injected into computer code (e.g., source code) for an application 104 in an unmanaged environment. In an unmanaged environment, source code (e.g., computer code that has not been compiled) may be accessible. This approach injects hooks directly into source code, and then the computer code is compiled into assembly language. The application 104 is accessed and the hook method 116 is performed instead of the target method 108. In another known approach, hooks are injected into compiled assembly language code.

Recently, a managed environment has been introduced for computer coding. A managed environment is an environment where the source code of an application 104 is compiled into intermediate language code. In a managed environment, the original source code may not be accessible (to the injection module 110, for example).

The systems and methods disclosed herein allow the hook method 116 to be injected into intermediate language code (e.g., managed code) that is created in a managed environment (e.g., a managed development environment). The intermediate language code may be partially compiled in that the source code has been compiled and may not be accessible. Furthermore, intermediate language code is not yet compiled into assembly language code. In some configurations, the intermediate language code may be a platform independent language.

In accordance with the systems and methods disclosed herein, the computing device 102 may inject the hook method 116 into the target method 108 module (of the application 104) in intermediate language. The intermediate language, including the injected hook method 116, may be compiled into assembly language code (which may be executed by the computing device 102). Accordingly, after injection, the assembly language code related to the application 104 may include the hook method 116. The computing device 102 may also replace, in the intermediate language code, calls to the target method 108 made by the caller method 106. The hook method 116 may be called (by the application 104) instead of the target method 108. For example, the functions within the hook method 116 may be performed by the application 104. In some configurations, the target method 108 may be called by the hook method 116 or application 104 as well. For example, the target method 108 may be called after the hook method 116 is complete based on a value returned by the hook method 116. Another situation where the target method may be called after completing the functions included within the hook method 116 may be where the function in the hook method 116 outputs information intended to be used by the target method 108. It should be noted that while functions are described in terms of particular modules herein, additional or alternative modules and/or a combination of modules or a sub-part of a module may perform one or more of the functions described herein.

Figure 2:
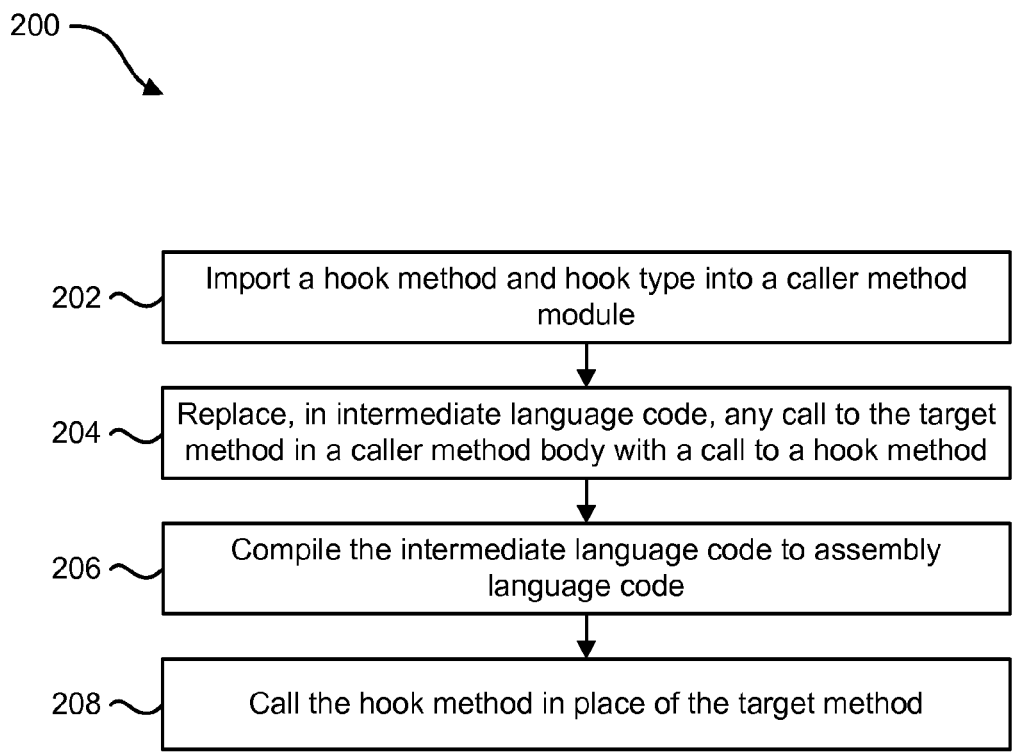
FIG. 2 is a flow diagram illustrating one configuration of a method 200 for performing hooks in a managed environment.

FIG. 2 is a flow diagram illustrating one configuration of a method 200 for performing hooks in a managed environment. A computing device 102 may include an application 104 with a caller method 106 and a target method 108 to be performed. An injection module 110 may import 202 a hook method 116 and hook type into the caller method module. For example, the computing device 102 may write the hook method (e.g., hook method code) into the module where the caller method 106 resides. In some configurations, importing 202 the hook method 116 into the caller method module may be based on one or more of the caller tokens 112 and target tokens 114. In cases where the module of the caller method 106 and the module of the target method 108 are different, the computing device 102 (e.g., injection module 110) may perform a fake import of the target method 108 into the caller method 106 module in order to retrieve a token of the target method 108 in the caller module, for example. This token may be later used in replacement.

The computing device 102 may replace 204, in intermediate language code, any call to the target method 108 in a caller method 106 body with a call to the hook method 116. For example, the computing device 102 may overwrite (in memory, for example) any call to the target method 108 in a caller method 106 body with a call to the hook method 116.

With the hook method 116 properly injected into the intermediate language code, the computing device 102 may compile 206 the intermediate language code to assembly language code. For example, the computing device 102 may just in time (JIT) compile the intermediate language code into assembly language code.

The computing device 102 (e.g., application 104) may call 208 the hook method 116 in place of the target method 108. For example, the computing device 102 may execute the assembly language code, which includes the injected hook method 116. For instance, because any call to the target method 108 from the caller method 106 has been replaced with a call to the hook method 116, the hook method 116 may be called in place of the target method 108.

Figure 3:
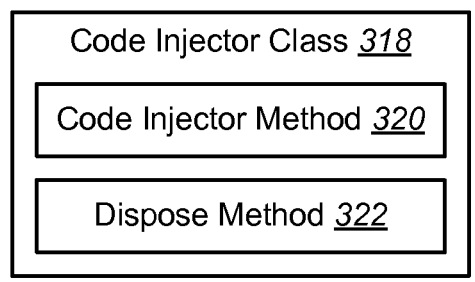
FIG. 3 is a block diagram illustrating one example of a code injector class that may be used to inject a hook method into intermediate language code in accordance with the systems and methods disclosed herein.

FIG. 3 is a block diagram illustrating one example of a code injector class 318 that may be used to inject a hook method 116 into intermediate language code in accordance with the systems and methods disclosed herein. The code injector class 318 may include a code injector method 320 and a dispose method 322. An instance of the code injector class 318 may be created in a target application to trigger an injection process. Once the selected (e.g., code injector method 320 or dispose method 322) code injector class is created, a native initialization function may be called. All undocumented common language runtime (CLR) structures may be initialized. Initialization of undocumented CLR structures may be achieved by extracting one or more hard coded offset values from program database (PDB) files and bounding the hard coded offset value to the CLR (e.g., CLR version).

Once function pointers are initialized, a CLR compiling method (e.g., compileMethod) may be hooked using a native hook mechanism. For example, the compiling method (e.g., compileMethod) may be triggered when intermediate language code is translated (e.g., compiled) into native code. For example, the compiling method may be utilized in two cases to compile the intermediate language code. For instance, the compiling method (e.g., compileMethod) may be triggered when a managed function was never called (e.g., the first time that a managed function is called) and/or when recompiling with a JIT compiler (ReJIT) for a method is requested. It should be noted that ReJIT was added in .NET 4.5 and was primarily targeted to be used in profilers. A profiler may be a tool that measures one or more metrics of a target application (e.g., central processing unit (CPU) usage of one or more (e.g., all) methods, memory usage, application performance, etc.).

If the initialization is completed successfully, a domain monitoring function may be started in timer callback. A timer may be utilized since there may not be a way to retrieve notifications about the creation of new application domains in the application. Accordingly, timer callback may periodically request a list of all application domains in the application. For new application domains, a computing device (e.g., timer) may perform a function (e.g., CreateInstanceFromAndUnwrap) that forces creation of an instance of an injector installation type (e.g., InjectorInstall) in a specified domain.

Figure 4:
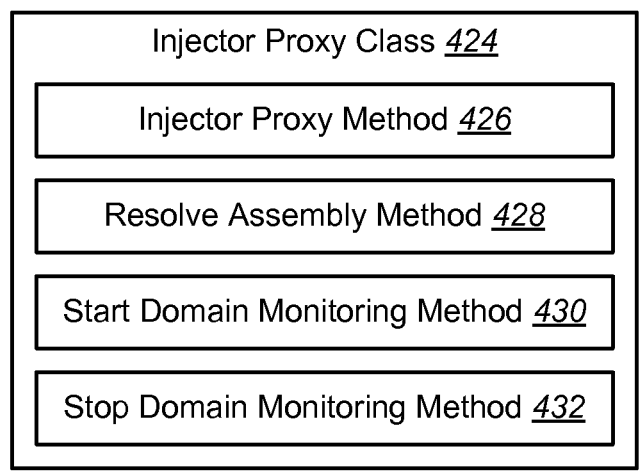
FIG. 4 is a block diagram illustrating one example of an injector proxy class.

FIG. 4 is a block diagram illustrating one example of an injector proxy class 424. The injector proxy class 424 may include an injector proxy method 426, a resolve assembly method 428, a start domain monitoring method 430 and a stop domain monitoring method 432. For example, in the constructor of InjectorInstall, a call may be made to the start domain monitoring method 430 (e.g., StartDomainMonitoring) of the injector proxy class 424.

The start domain monitoring method 430 may subscribe a current domain on assembly load (e.g., AssemblyLoad) and assembly resolve (e.g., AssemblyResolve) events. Because applications 104 may load dependencies as needed, a target method 108 that is desired to be hooked may be absent at a time when initialization is performed. Subscription on an assembly load (e.g., AssemblyLoad) event may be utilized to manage the issue. On an assembly load event, a search for the function of interest (e.g., the target method 108) may be performed in the loading assembly. If the function of interest (e.g., the target method 108) and its scope (e.g., the caller method 106) is found, an injection is triggered.

Subscription on the assembly resolve (e.g., AssemblyResolve) event may be beneficial, particularly if the hook code (e.g., hook method 116) references code (e.g., assembly code) that is not part of the original application 104. Attempting to call a hook method 116 may cause a dynamic link library (DLL) dependency to be resolved. In this handler, the CLR may be provided with all needed dependencies.

FIG. 5 is a block diagram illustrating one example of a hook class 534. Once subscription on assembly load (e.g., AssemblyLoad) and assembly resolve (e.g., AssemblyResolve) events is complete a list of hooks to be installed is created. In the systems and methods disclosed herein three methods may be used: a caller method 106, a target method 108 and a hook method 116. In order to install a managed hook the caller method 106, target method 108 and hook method 116 may be resolved.

Managed hooks may be represented by a hook class 534. The hook class 534 may include caller binding properties 536, hook method properties 538, caller method properties 540, target binding properties 542, caller method name properties 544, target method properties 546, caller parameter properties 548, target method name properties 550, caller type properties 552, target parameters properties 554, caller type name properties 556, target type properties 558, hooked properties 560, target type name properties 562, an inject method 564 and a remove method 566.

The hook class 534 may contain information that identifies where the hooks are to be installed. In known approaches, two methods are generally used to install a hook; these methods are a target method 108 and a hook method 116. Once a hook class 534 is installed, a call to the target hook 108 may be redirected to the hook method 116.

Figure 6:
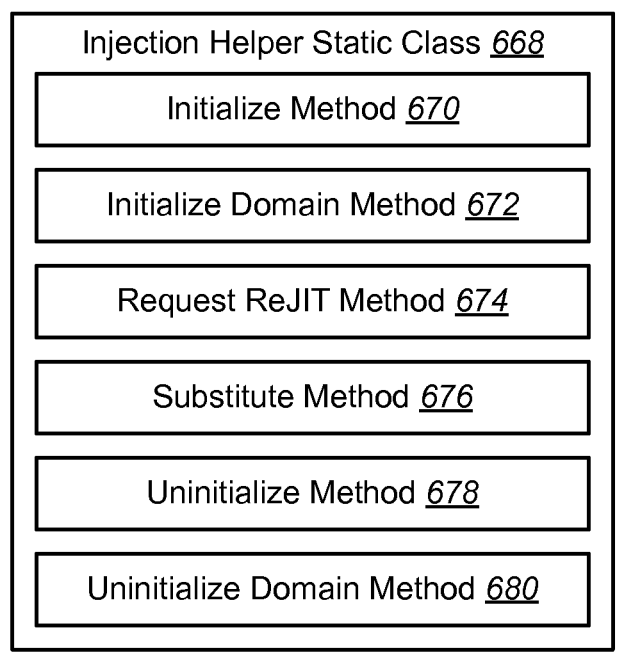
FIG. 6 is a block diagram illustrating one example of an injection helper class.

FIG. 6 is a block diagram illustrating one example of an injection helper class 668. The injection helper class 668 may be a static class. The injection helper class 668 may include an initialize method 670, an initialize domain method 672, a request ReJIT method 674, a substitute method 676, an uninitialize method 678 and an uninitialized domain method 680. A set of hook methods 116 to be installed may be installed by the start domain monitoring method 430 (e.g., StartDomainMonitoring) iteratively checking all loaded assemblies. The start domain monitoring 130 (e.g., StartDomainMonitoring) may try to install all the hook methods 116 through a process hooks method (e.g., ProcessHooks). The process hooks method (e.g., ProcessHooks) may in turn iteratively attempt to inject the hook methods 116 into specified assemblies (e.g., target methods 108) using a hook class method inject (e.g., Inject). The inject method may delegate code flow to the substitute method 676.

Figure 7:
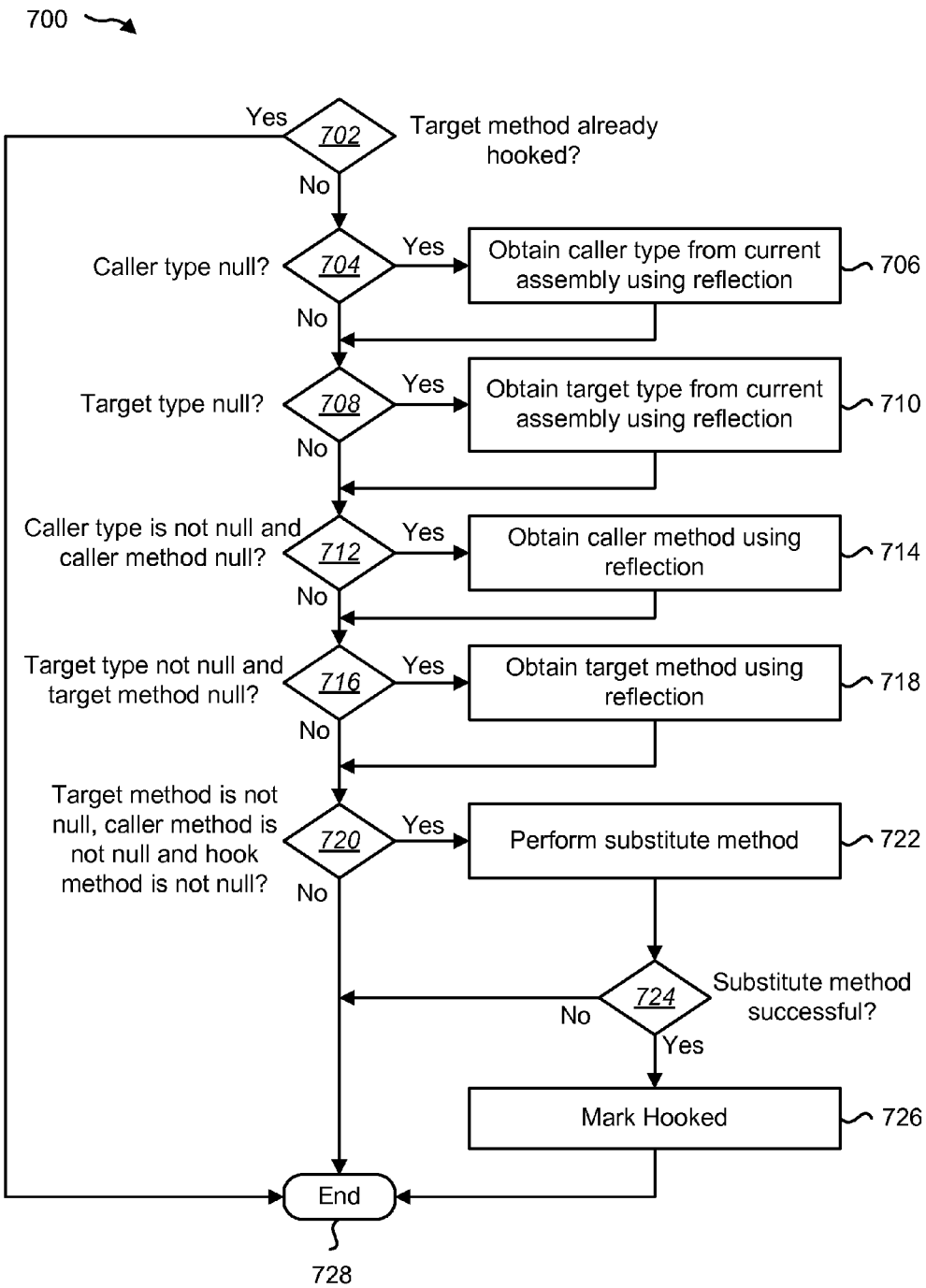
FIG. 7 is a flow diagram illustrating one configuration of a method for injecting a hook method in a specified assembly.

FIG. 7 is a flow diagram illustrating one configuration of a method 700 for injecting a hook method 116 in a specified assembly. The method 700 may obtain information (e.g., one or more types, methods, etc.) corresponding to the caller method 106 and/or target method 108, for example. As illustrated in FIG. 7, if caller methods 106, target methods 108 and hook methods 116 are resolved, a substitute method may be performed (e.g., code flow is redirected to a managed substitute method (e.g., method 800 of FIG. 8)). In some configurations, the method 700 may be performed by a computing device (e.g., an injection module 110 located within a computing device 102.) For example, FIG. 7 may depict an algorithm of an inject method 564 of a hook class 534.

The injection module 110 may determine 702 if a target method 108 is already hooked. If the target method 108 is already hooked, the method 700 may end 728. For example, the injection module 110 may determine if a hook method 116 is already injected by checking an indicator or flag corresponding to the target method 108. For instance, when a target method 108 is hooked, the computing device 102 may mark (e.g., set an indicator or flag corresponding to) the target method 108 as hooked. The target method 108 may be unmarked when the hook method 116 is uninstalled in some configurations.

If the target method 108 is not already hooked, the injection module 110 may determine 704 if a caller type is null. If the caller type is not null, the injection module 110 may determine 708 if a target type is null. If the caller type is null, the injection module 110 may obtain 706 the caller type from a current assembly using reflection. Reflection may be a procedure (e.g., a feature of the framework) that allows retrieving information about the type (e.g., caller type, target type, etc.) of any instance at runtime. Reflection may also allow retrieving information about one or more loaded assemblies, one or more types (e.g., target type, caller type, etc.) in the assemblies, one or more methods (e.g., target method 108, caller method 106, hook method 116, etc.) and/or attributes in the types, one or more parameters and/or one or more return types in the method(s). In some configurations, reflection may be provided by the .NET framework. Accordingly, any instance at runtime may have a reference to its original type.

The injection module 110 may determine 708 if a target type is null. If the target type is not null, the injection module 110 may determine 712 if a caller type is not null and caller method 106 is null. If the target type is null, the injection module 110 may obtain 710 the target type from the current assembly using reflection.

The injection module 110 may determine 712 if the caller type is not null and caller method 106 is null. If the caller type is null or the caller method 106 is not null, the injection module 110 may determine 716 if the target type is not null and the target method 108 is null. If the caller type is not null and caller method 106 is null, the injection module 110 may obtain 714 the caller method 106 using reflection.

The injection module 110 may determine 716 if the target type is not null and target method 108 is null. If the target type is null or the target method 108 is not null, the injection module 110 may determine 720 if the target method 108 is not null, the caller method 106 is not null and the hook method 116 is not null. If the target type is not null and the target method 108 is null, the injection module 110 may obtain 718 the target method 108 using reflection.

The injection module 110 may determine 720 if the target method 108 is not null, the caller method 106 is not null and the hook method 116 is not null. If the target method 108 is null, the caller method 106 is null or the hook method 116 is null, the injection module 110 may end 728 the method 700.

If the target method 108 is not null, the caller method 106 is not null and the hook method 116 is not null, the injection module may perform 722 the substitute method. One example of the substitute method is discussed in relation to FIG. 8 below. The injection module 110 may determine 724 if the substitute method was successful. If the substitute method was successful, the injection module 110 may mark 726 the target method 108 as hooked and the method may end 728. If the substitute method was not successful the method 700 may end 728.

Figure 8:
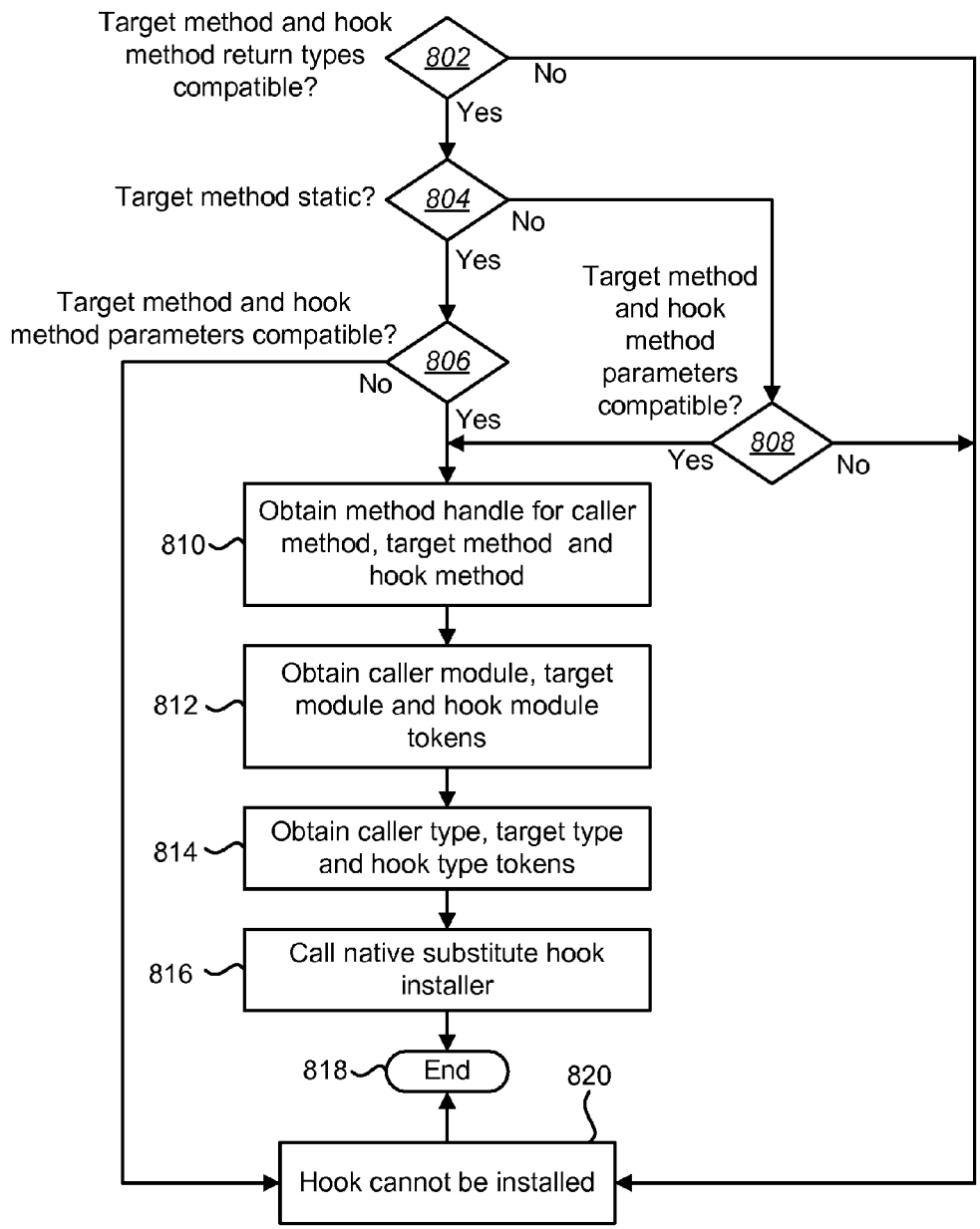
FIG. 8 is a flow diagram illustrating one configuration of a method substitution in a managed environment.

FIG. 8 is a flow diagram illustrating one configuration of a method 800 substitution in a managed environment (e.g., SubstituteMethod). As discussed above in relation to FIG. 7, if a caller method 106, target method 108 and hook method 116 were compatible the flow is directed to substitute method function.

The target method 108 and hook method 116 may be compatible if the values returned by these various checks and input parameters type are the same or if either the return value or input parameters type is not void and the other method has an object type.

In some configurations, the substitute method may be performed by an injection module 110 located within a computing device 102. The injection module 110 may determine 802 if target method 108 and hook method 116 return types are compatible. For example, the target method 108 and the hook method 116 may be compatible if the target method 108 return type is "void" (e.g., the target method 108 returns "void") and the hook method 116 return type is also "void" (e.g., the hook method 116 returns "void"). In another example, assume that the target method 108 return type is not "void" and the hook method 116 return type is also not "void." In this case, if the hook method 116 returns the same type as that of the target method 108 or if the hook method 116 returns an "object" type, then the return types may be compatible. Otherwise, the return types may not be compatible. If the target method 108 and a hook method 116 return types are not compatible, the hook method 116 cannot be installed 820 and the substitute method ends 818.

If the target method 108 and a hook method 116 return types are compatible, the injection module 110 may determine 804 if the target method 108 is static. If the target method 108 is static, the injection module 110 may determine 806 if the target method 108 and hook method 116 parameters are compatible. Since the target method 108 is static, the parameter count in the hook method 116 and target method 108 should be the same. For example, if the number of parameters in the target method 108 is equal to the number of parameters in the hook method 116, then the target method 108 and the hook method 116 may be compatible. Otherwise, the target method 108 and the hook method 108 may be incompatible. If the target method 108 and hook method 116 parameters are not compatible, the hook method 116 cannot be installed 820 and the substitute method ends 818.

If the target method 108 is not static, the injection module 110 may determine 808 parameter compatibility of the target method 108 and the hook method 116. For example, the computing device 102 (e.g., injection module 110) may determine a number of parameters (e.g., parameter count) of the target method 108 and a number of parameters (e.g., parameter count) of the hook method 116. Since the target method 108 is not static in this case, the parameter count in the hook method 116 and the target method 108 should be different by one. For instance, the parameter count of the target method 108 should be one less than the parameter count of the hook method 116, due to the automatic "this" parameter of the non-static target method 108. In one specific example, "void TargetMethod(int p1)" should be one less than "static void HookMethod(object self, int p1)." In other words, the parameter count of the hook method 116 should be one more than the parameter count of the target method 108 due to the automatic "this" parameter of the non-static target method 108. Accordingly, the parameter compatibility determinations 806, 808 for the static and non-static cases may be different. In particular, in the case of a static target method, the comparison is more direct because there is no automatic "this" in the static target method 108 and the number of parameters in hook method 116 and the target method 108 should be equal and types compatible. In the case of the non-static target method 108, the automatic "this" may be taken into account. If the target method 108 parameters and the hook method 116 parameters are not compatible, the hook method 116 cannot be installed 820 and the substitute method ends 818.

If the target method 108 parameters and the hook method 116 parameters are compatible, the injection module 110 may obtain 810 a method handle (e.g., caller.MethodHandle.Value) for the caller method 106, target method 108 and hook method 116. The injection module may obtain 812 caller module (e.g., MethodInfo.Module.MetadataToken), target module and hook module tokens. A token may be a four byte integer number that describes a function's managed function, managed property or managed instance. In one example, tokens may be utilized in .NET 4.5. A token corresponding to an original method may be replaced by a token corresponding to a hook method 116

The injection module 110 may obtain 814 caller type (e.g., MethodInfor.ReflectedType.MetadataToken), target type and hook type tokens. The injection module 110 may call 816 a native substitute hook installer (e.g., Substitute Method) and install the hooks in an application 104. The substitute method may end 818.

Figure 9:
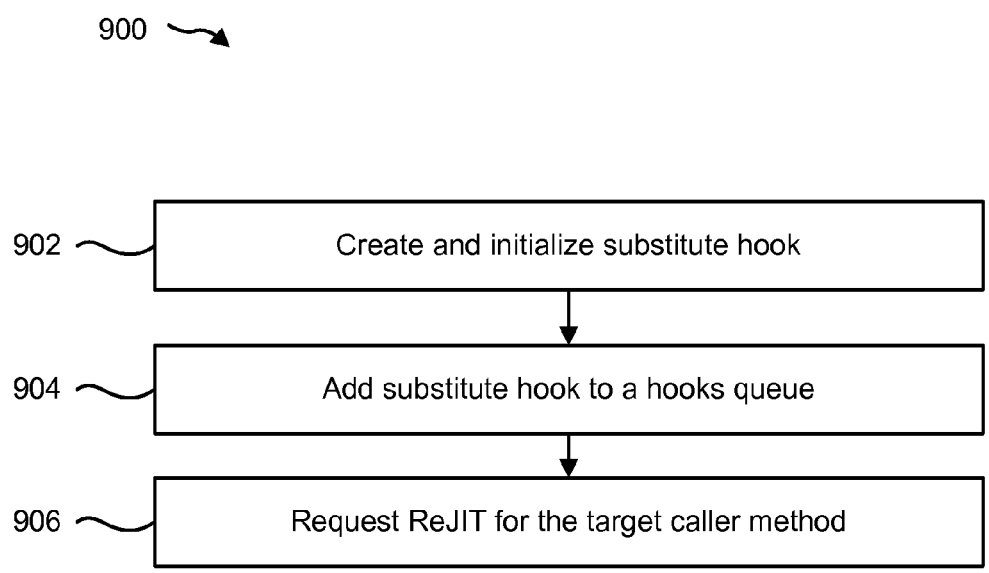
FIG. 9 is a flow diagram illustrating one configuration of a method for method substitution in a native portion of a managed environment.

FIG. 9 is a flow diagram illustrating one configuration of a method 900 for method substitution in a native portion of a managed environment. The method 900 may be performed by an injection module 110 located within a computing device 102. Once the methods are checked and the method and type tokens have been obtained, the substitute method may call a native substitute method which creates, initializes and then queues a substitute hook. The injection module 110 may call a managed substitute method, which calls a native substitute method. The injection module 110 may create 902 and initialize substitute hooks (e.g., SubstituteHook). The injection module 110 may add 904 the substitute hooks to a hooks queue through the substitute method 676. The injection module 110 may request 906 ReJIT for the target caller method (e.g., RequestReJIT).

Figure 10:
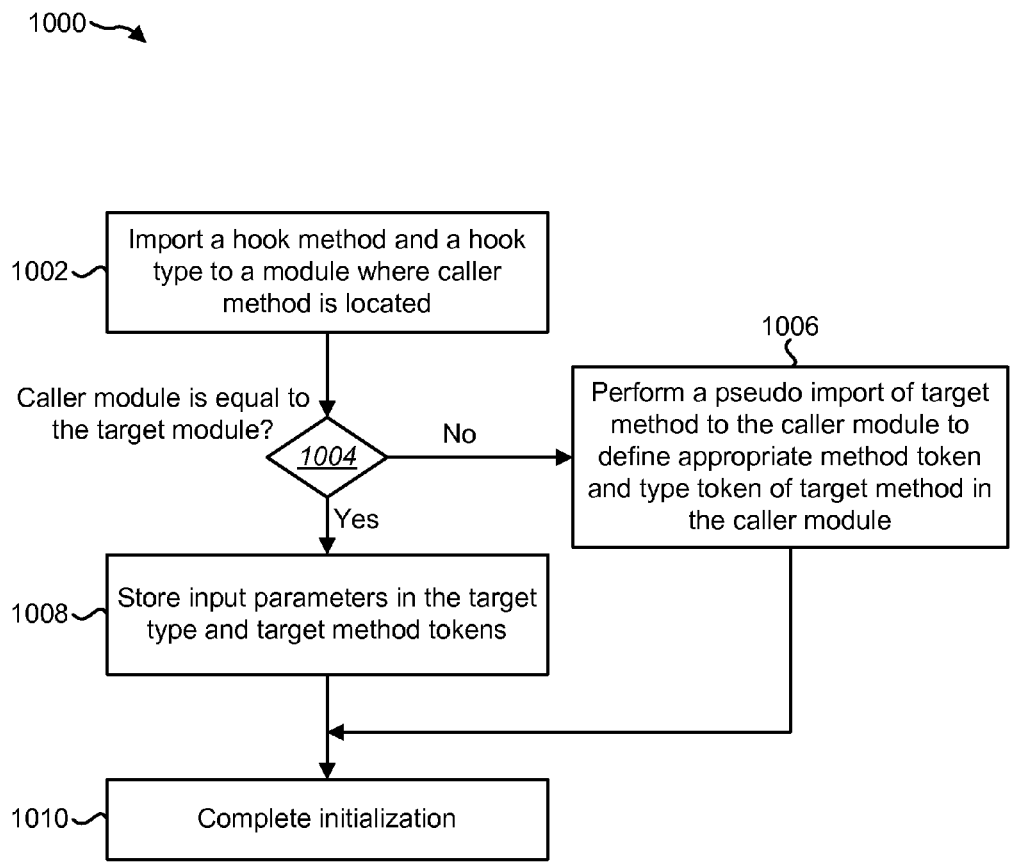
FIG. 10 is a flow diagram illustrating one configuration of a method for initialization of a substitution hook.

FIG. 10 is a flow diagram illustrating one configuration of a method 1000 for initialization of a substitution hook. This method 1000 may be performed by an injection module 110 located within a computing device 102. The injection module 110 may import 1002 a hook method 116 and a hook type to a module containing a caller method 106. An example of importing is given in connection with FIG. 11. The hook method 116 may be a method that is to be performed in place of the target method 108.

The injection module 110 may determine 1004 if the caller module is equal to the target module. If the caller module and target module are not equal, the injection module may perform 1006 a pseudo import of target method 108 to the caller module to define appropriate method token and type token of target method 108 in the caller module. An example of importing is given in connection with FIG. 11. A token corresponding to an original method may be replaced by a token corresponding with a hook method 116.

The injection module 110 may complete 1010 the initialization of the substitution hook. If the injection module 110 determines 1004 that the caller module and the target module are equal (e.g., are the same module), the injection module 110 may store 1008 input parameters in the target type and target method 108 tokens. For example, the target type and target method 108 tokens may be stored in the caller module. The injection module 110 may complete 1010 the initialization of the substitution hook.

Figure 11:
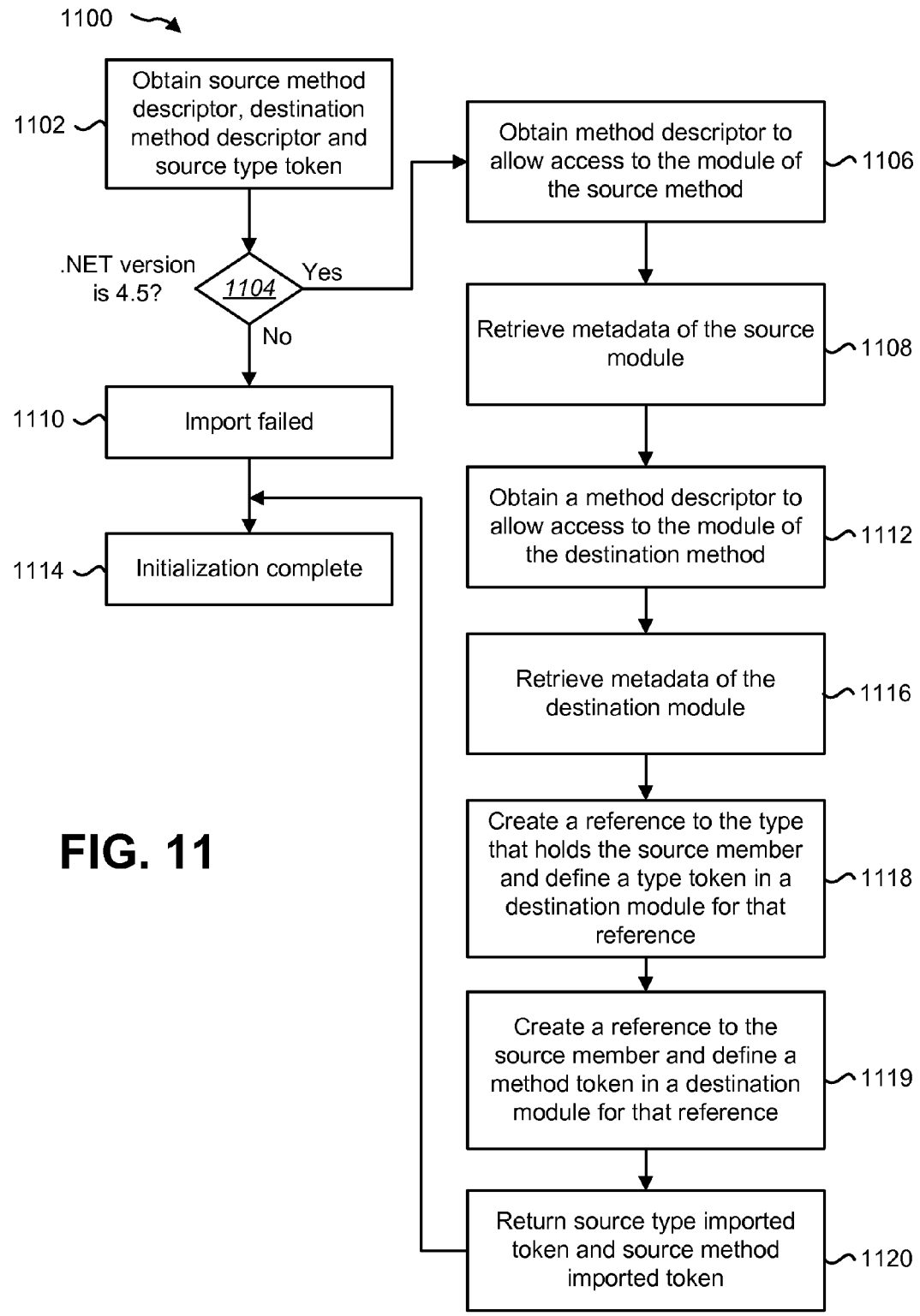
FIG. 11 is a flow diagram illustrating one configuration of a method for importing a type and method using unmanaged metadata from an application programming interface.

FIG. 11 is a flow diagram illustrating one configuration of a method 1100 for importing a type and method using unmanaged metadata from an application programming interface. In order to call a method, a CLR should have a set of tokens corresponding to the methods and types in its metadata table. In order to call a hook method 116 in the caller method 106, the hook method 116 and the hook type may be registered in the caller module. One example of how this is done is an unmanaged metadata API from Microsoft. A method called GetReadablePublicMetaDataInterface may be used to obtain metadata interfaces. In some configurations, GetReadablePublicMetaDataInterface is not part of the API. GetReadablePublicMetaDataInterface may be an undocumented function that returns an interface that is documented in the unmanaged metadata API. One example of a method 1100 for this process is shown in FIG. 11.

The method 1100 may be performed by an injection module 110 located within a computing device 102. The injection module may obtain 1102 source method descriptor, destination method descriptor and source type token. The injection module 110 may determine 1104 if the .NET version is 4.5. If the .NET version is not 4.5, the import failed 1110 and the initialization process is complete 1114. It should be noted that the systems and methods disclosed herein may be applied to other versions of .NET.

If the .NET version is 4.5, the injection module may obtain 1106 method descriptor using an undocumented method (e.g., GetLoaderModule) to allow access to the module of the source method. The injection module 110 may retrieve 1108 metadata of the source module. In some configurations, this may be accomplished using an undocumented method (e.g., GetReadablePublicMetaDataInterface of the Module class). The metadata retrieved 1108 may include the IMetaDataAssemblyImport and IMetaDataImport interface of the source module, for example. The injection module 110 may obtain 1112 a method descriptor. In some configurations, the method descriptor may be obtained 1112 using an undocumented method (e.g., GetLoaderModule) to allow access to the module of the destination method. The injection module 110 may retrieve 1116 metadata of the destination module. In some configurations, this may be accomplished by using an undocumented method (e.g., GetReadablePublicMetaDataInterface). The metadata retrieved 1116 may include the IMetaDataAssemblyEmit and IMetaDataEmit interface of the destination module, for example. The injection module 110 may create 1118 a reference using an import type (e.g., DefineImportType) to the type that holds the source member and define a type token in the destination (e.g., caller method 106) module for that reference. The injection module 110 may create 1119 a reference using an import member (e.g., DefineImportMember) to the source member and define a method token in the destination (e.g., caller method 106) module for that reference. The source type imported token and source method imported token may be returned 1120 by the injection module 110 and the initialization process may be complete 1114.

Figure 12:
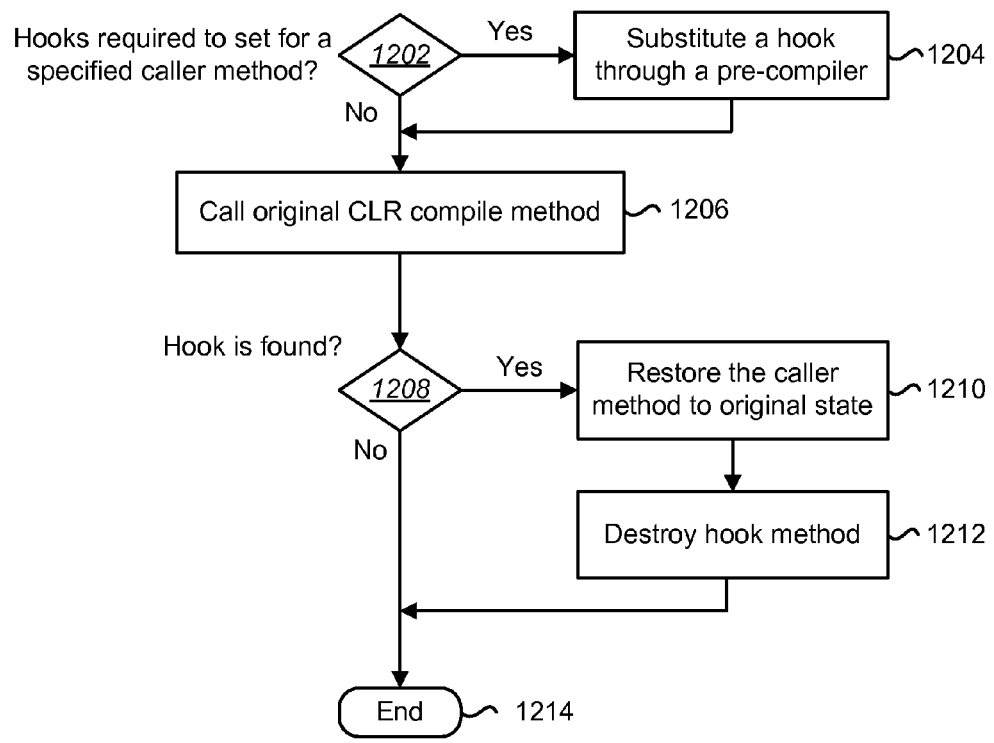
FIG. 12 is a flow diagram illustrating one configuration of a method for a common language runtime (CLR) to compile a method for hooking in a managed environment.

FIG. 12 is a flow diagram illustrating one configuration of a method 1200 for a common language runtime (CLR) to compile a method for hooking in a managed environment. An injection module 110 located within a computing device 102 may perform the method 1200. The method shown in FIG. 12 may occur when a ReJIT is requested for a method triggers a method recompilation which is already hooked to a CLR compile method.

The injection module 110 may determine 1202 if hooks are required to set for a specified caller method 106. If it is determined 1202 that hooks are required, the injection module 110 may substitute 1204 a hook through a pre-compiler. Substituting the hook through the pre-compiler may substitute a hook prior to compiling an intermediate language into assembly language. One example of substituting a hook through the pre-compiler is discussed in FIG. 13. When the hook pre-compile is complete the injection module may call 1206 an original CLR compile method. The injection module may call 1206 the original CLR compile method if the injection module determines 1202 hooks are not required for a specified caller method 106.

The injection module 110 may determine 1208 if a hook is found in the compiled code. If a hook is found, the injection module 110 may restore 1210 the caller method 106 to its original state (before hooking, for instance). For example, in post-compile, the caller method 106 intermediate language body may be restored to its original state. For instance, the injection module 110 may replace one or more calls to the hook method with one or more calls to the target method. In some configurations, the injection module may substitute a hook through a post-compiler. The post-compiler may be used to remove hook methods 116 from target methods 108. The hook may be destroyed 1212 by removing any token or call to the hook method in the caller method 106. The method 1200 may end 1214 once any hook methods 116 are destroyed. The method 1200 may end if the injection module 110 determines 1208 a hook was not found.

Figure 13:
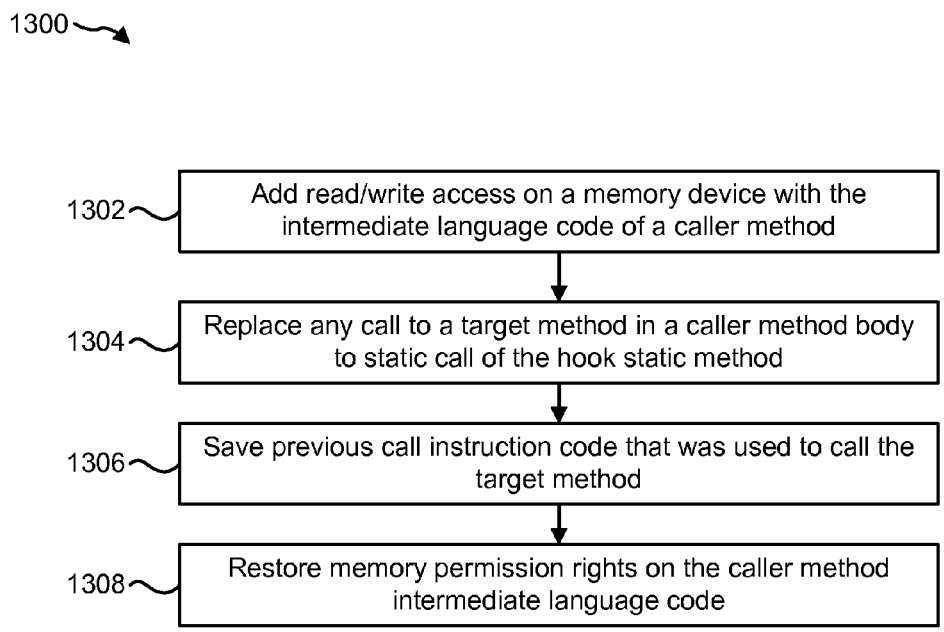
FIG. 13 is a flow diagram illustrating one configuration of a method for substituting a hook during a pre-compile routine.

FIG. 13 is a flow diagram illustrating one configuration of a method 1300 for substituting a hook during a pre-compile routine. An injection module 110 located within a computing device 102 may perform the hook substitution. If a hook was installed before the compile method was called a hook (e.g., pre-hook) may be called which will modify a method body. The injection module 110 may add 1302 read/write access on a memory device with the intermediate language code of the caller method 106. The injection module 110 may replace 1304 any call to a target method 108 in a caller method 106 body to any static call of the hook static method.

The injection module 110 may save 1306 previous call instruction code that was used to call the target method 108. The injection module 110 may restore 1308 memory permission rights on the caller method 106 intermediate language code.

Figure 14:
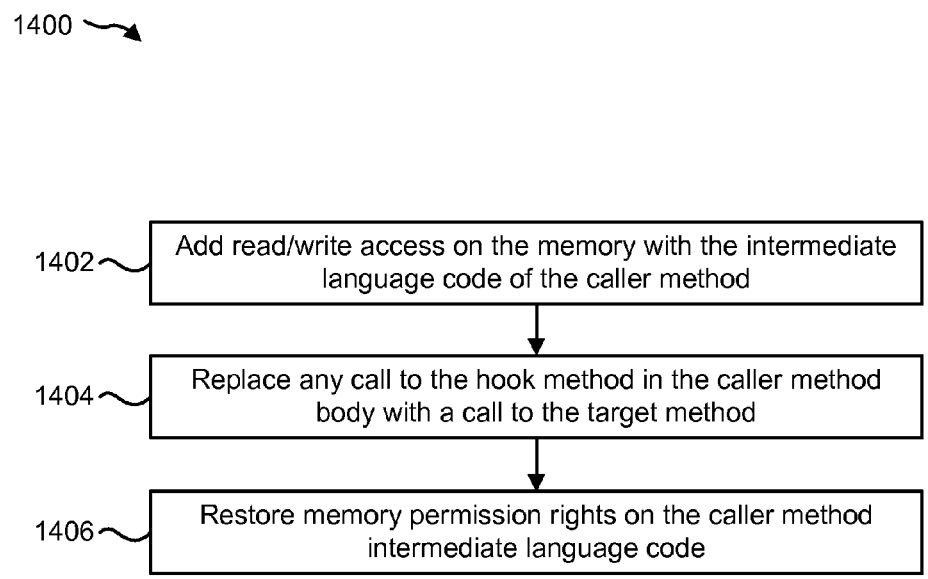
FIG. 14 is a flow diagram illustrating one configuration of a method for substituting a hook during a post-compile routine.

FIG. 14 is a flow diagram illustrating one configuration of a method 1400 for substituting a hook during a post-compile routine. An injection module 110 located within a computing device 102 may perform the hook substitution. If a hook was installed after the compile method was called a hook (e.g., post-hook) may be called which will modify a method body. The injection module 110 may add 1402 read/write access on a memory device with the intermediate language code of the caller method 106. The injection module 110 may replace 1404 any call to a hook method 116 in a caller method 106 body to the original call of the target method 108. The injection module 110 may restore 1406 memory permission rights on the caller method 106 intermediate language code.

Figure 15:
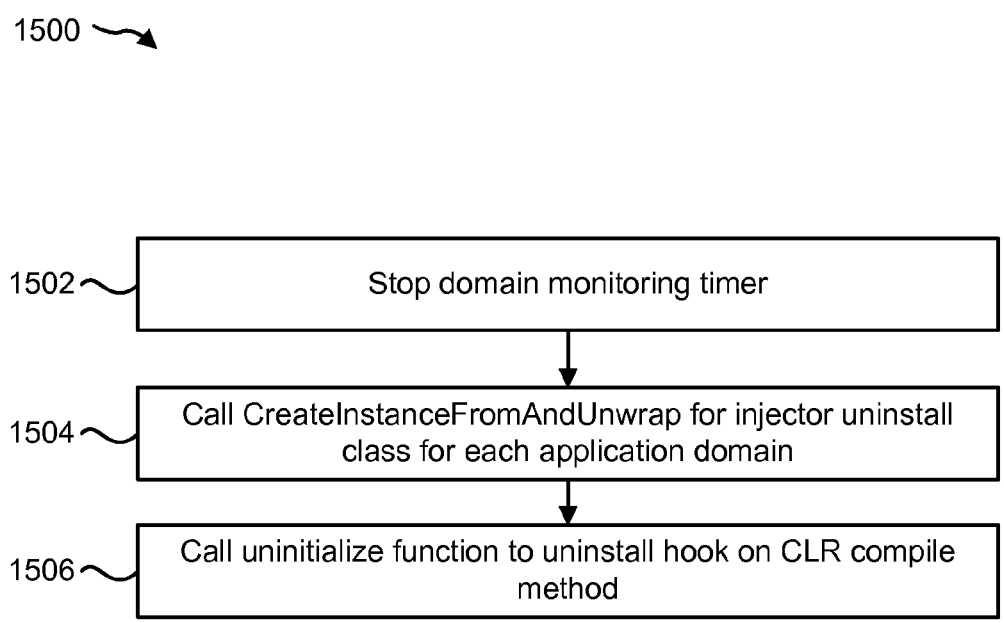
FIG. 15 is a flow diagram illustrating one configuration of a method for disposing of a hook in a managed environment.

FIG. 15 is a flow diagram illustrating one configuration of a method 1500 for disposing of a hook in a managed environment. A code injector method may be performed by a computing device 102 to destroy managed hooks. This computing device 102 stops 1502 domain monitoring timer. The computing device 102 verifies that every domain that was hooked performs an injector uninstall method by calling 1504 CreateInstanceFromAndUnwrap for injector uninstall class for each application domain. The injector uninstall class may unsubscribe from assembly load events and assembly resolve events. Hook removal may consist of invoking ReJIT for a caller method 106. Once all domains are unhooked, the computing device 102 may call 1506 an uninitialize function to unhook a CLR compile method.

Figure 16:
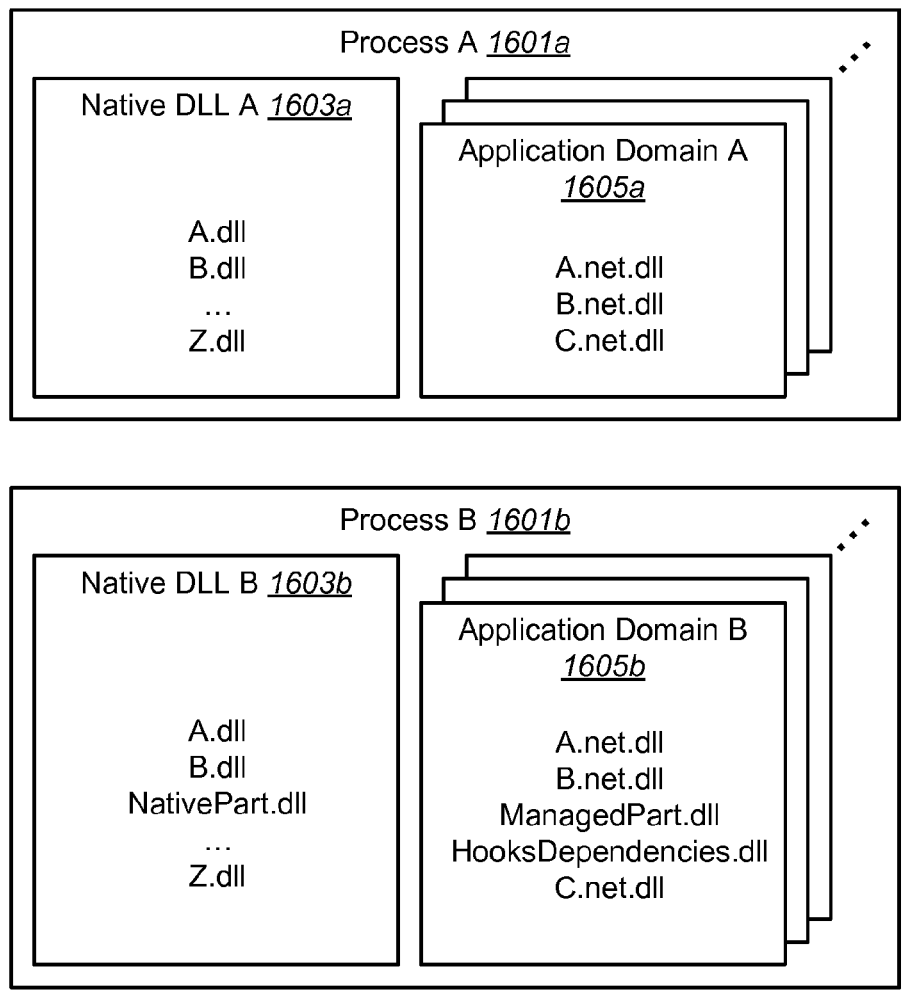
FIG. 16 illustrates an example of a process before and after a hook is imported.

FIG. 16 illustrates one example of process A-B 1601a-b before and after a hook is imported. In particular, FIG. 16 illustrates an example of hooking that may be performed as described in connection with one or more of FIGS. 1-15. Process A 1601a is a process before a hook is imported and process B 1601b is a process after a hook is imported (e.g., installed, injected, etc.). Process A-B 1601a-b may include native dynamic link library (DLL) A-B 1603a-b and one or more application domains A-B 1605a-b. Native DLL A-B 1603a-b may be a library of unmanaged computer code and information (e.g., functions, variables, etc.) available to the different application domains located within the process A-B 1601a-b. Before a hook is imported, the native DLL 1605a may contain libraries of computer code (e.g., A.dll, B.dll, . . . , Z.dll) that may be used by the one or more application domains 1605a. The computer code located within the native DLL 1605a may be used by one or more application domains 1605a. The one or more application domains 1605a may include managed code (e.g., A.net.dll, B.net.dll, C.net.dll, etc.).

After a hook (e.g., hook method) is imported, native DLL B 1603b may include a NativePart.dll in addition to the libraries of computer code (e.g., A.dll, B.dll, . . . , Z.dll) that may be used by one or more application domains B 1605b. The computer code located within native DLL B 1605b may also be used by one or more application domains 1605b at the same time. One or more application domains B 1605b may include managed code (e.g., A.net.dll, B.net.dll, C.net.dll, etc.). After a hook is imported, one or more application domains B 1605b may also include a ManagedPart.dll and a HooksDependencies.dll.

NativePart.dll may be a native dynamic link library that includes native methods that may be used during a hooking process. The native methods may include initialization of undocumented CLR method pointers, a hook function for the CLR CompileMethod, a set of functions for creating a substitute hook, requesting reJIT compiling and/or managing metadata. ManagedPart.dll may be a managed dynamic link library that includes methods that are also used during a hooking process. The managed part methods may include initialization of an application domain, resolving loading assemblies, searching for a target method 108 in loaded assemblies, creating a managed part of hooks and/or monitoring application domains. HooksDependencies.dll may be a set of managed dynamic link libraries that may be utilized (e.g., required) when a hook method 116 is compiled. For example, HooksDependencies.dll may include logic that extends the functionality of the target application.

Figure 17:
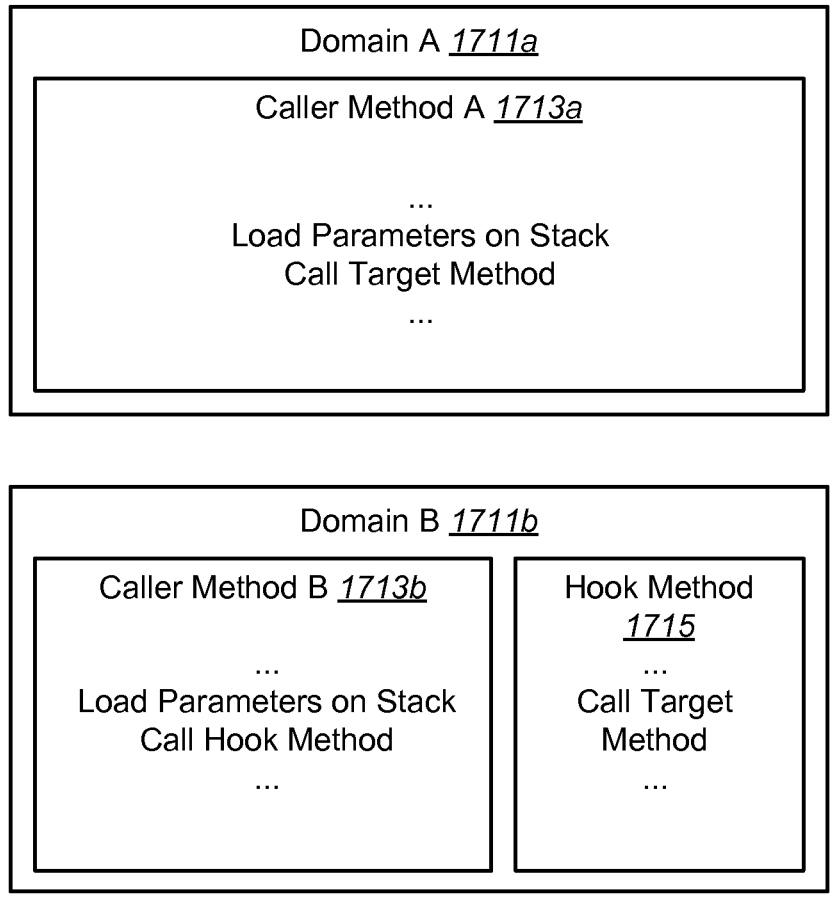
FIG. 17 illustrates an example of a domain before and after a hook is imported.

FIG. 17 illustrates one example of a domain 1711a-b before and after a hook is imported. In particular, FIG. 17 illustrates an example of hooking that may be performed as described in connection with one or more of FIGS. 1-16. Domain A-B 1711a-b may include caller method A-B 1713a-b (as discussed above in connection with one or more of FIG. 1 and FIG. 5, for example). Before a hook is imported, caller method A 1713a may include code that calls other methods and performs certain functions (e.g., Load Parameters on Stack and Call Target Method). After a hook is imported, domain B 1711b may include the hook method 1715 and caller method B 1713b. Importing a hook method 1715 may change the function called by the caller method 1713b to call the hook method 1715 instead of a target method. The hook method 1715 may optionally call the target method.

Figure 18:
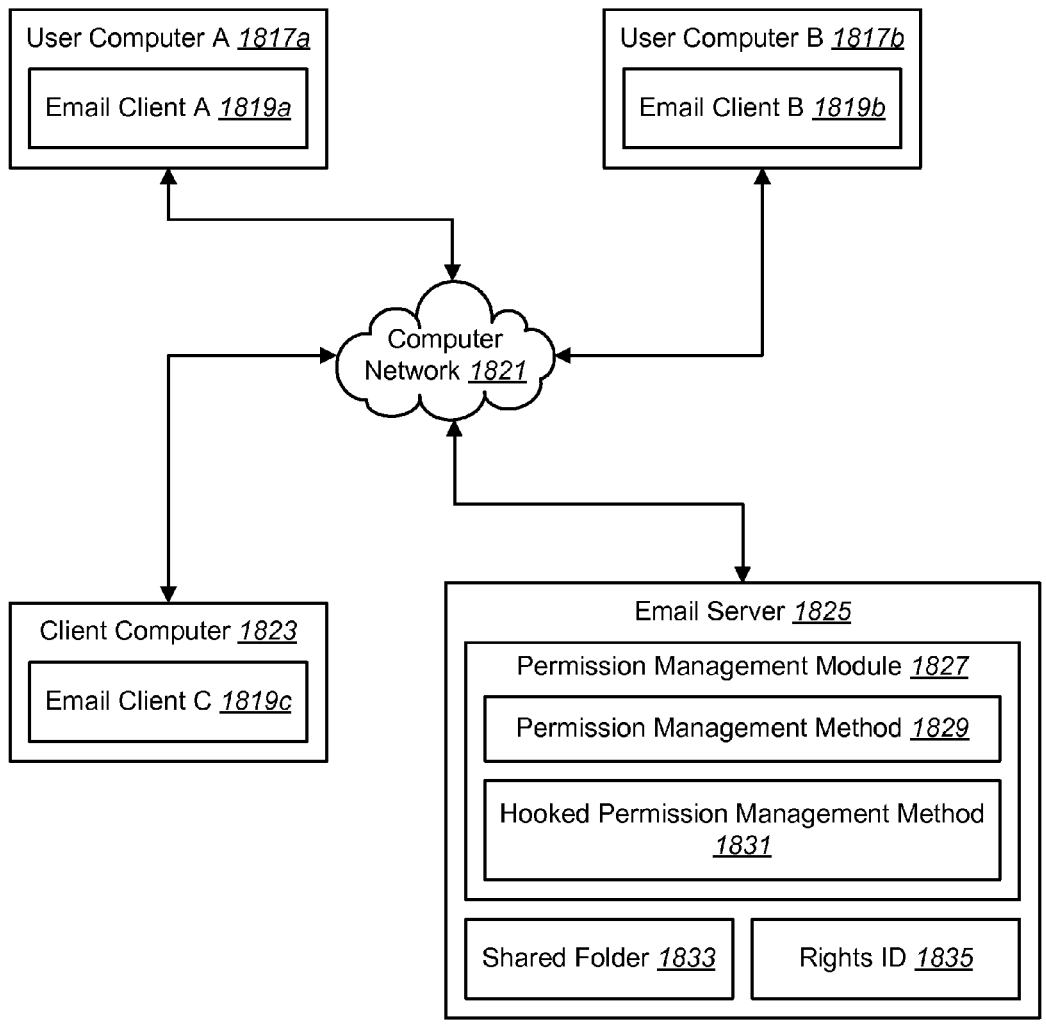
FIG. 18 illustrates one example of a computer network environment in which some configurations of the systems and methods disclosed herein may be implemented.

FIG. 18 illustrates one example of a computer network 1821 environment in which some configurations of the systems and methods disclosed herein may be implemented. The network environment may include an email server 1825, a client computer 1823, user computer A 1817a and user computer B 1817b. One or more of the client computer 1823, user computer A 1817a, user computer B 1817b and the email server 1825 may be examples of the computing device 102 described in connection with FIG. 1. The client computer 1823, user computer A 1817a and user computer B 1817b may each include a respective email client A-C 1819a-c. An email client 1819 may be a program or application (e.g., Microsoft Outlook) to access email communications or other data stored remotely (e.g., calendar, contacts etc.). Each of email clients A-C 1819a-c may access the email server 1825 through the computer network 1821 to retrieve information located within the email server 1825.

The email server 1825 may include a permission management module 1827, a shared folder 1833 and/or a rights ID 1835. The email server 1825 may run an email system (e.g., Microsoft Exchange) to store the information to be accessed by email clients A-C 1819a-c. One example of information stored within the email server may be the shared folder 1833. The shared folder 1833 may include files to be attached to emails or other information to be used (e.g., accessed, attached to emails, modified, etc.) by user computer A 1817a and/or user computer B 1817b. The permission management module 1827 may include a permission managed method 1829. The permission management method 1829 may manage user permission (e.g., authorization, authentication, access, etc.). For example, the permission management method 1829 may verify permission of a user that is attempting to access the information located within the email server 1825 (e.g., the shared folder 1833). The permission management method 1829 may determine a user has the proper rights to access particular information located within the email server 1827 by utilizing the rights ID 1835. The rights ID 1835 may include the status of each end-users' current permission rights.

The permission management method 1829 may have limited functionality. The hooked permission management method 1831 may be injected as described above in connection with one or more of FIGS. 1-17. For example, the hooked permission management method 1831 may be imported (e.g., injected) to provide additional and/or different functionality.

In some configurations, the hooked permission management method 1831 may include functions to improve security or tracking features of the email server 1825. For example, a first user may desire to authorize a second user to access the first user's email information and/or functionality. For instance, user computer A 1817a may provide (e.g., license, delegate, etc.) permission to user computer B 1817b (e.g., a particular user on computer B 1817b) to access account information stored for user computer A 1817a. It should be noted that the following examples may be described in terms of user computer A 1817a and user computer B 1817b. However, one or more of the following examples may be applicable to any computer on the computer network 1821 that is being utilized by one or more particular users (e.g., users with particular identification, logins and/or credentials). Accordingly, for example, user computer A 1817a may be any computer on the computer network 1821 that is being utilized by a first user and user computer B 1817b may be any computer on the computer network 1821 that is being utilized by a second user.

In some configurations, the hooked permission management method 1831 may add a function that tracks when user computer B 1817b logs in and logs out of the email account for user computer A 1817a. Additionally or alternatively, the hooked permission management method 1831 may add a function that tracks what files and other information user computer B 1817b accessed while logged in.

Additionally or alternatively, the hooked permission management method 1831 may create a blacklist or whitelist of email accounts user computer B 1817b may send emails to while logged into the account for user computer A 1817a. Another additional or alternative tracking function that may be added by the hooked permission management method 1831 is tracking what computer, physical location and/or network user computer B 1817b has logged into the email account from.

In some configurations, the hooked permission management method 1831 may add security features to increase the control a first user (of user computer A 1817a, for example) has over the actions of a second user (of user computer B 1817b, for example) while using the account of the first user. For example, the hooked permission management method 1831 may add a function to limit what information can and cannot be deleted by user computer B 1817b. Additionally or alternatively, the hooked permission management method 1831 may block user computer B 1817b from moving information or may only allow information to be moved to particular locations. The ability to limit or block entirely the option to attach files to emails by user computer B 1817b may also be a feature added by the hooked permission management method 1831. Another example of a security feature that may be added by the hooked permission management method 1831 is automatically courtesy copying a first user or user computer A 1817a on any emails sent by user computer B 1817b while accessing the account for the first user.

In some configurations, the hooked permission management method 1831 may restrict access for a user from a particular computer (e.g., user computer B 1817b), network or physical location. For example, the hooked permission management method 1831 may not allow user computer B 1817b to log in to the account for user computer A 1817a if user computer B 1817b is a public (or unknown) computer. Additionally or alternatively, the hooked permission management method 1831 may provide an ability to block access to user computer B 1817b outside of a particular time frame. For example, user computer B 1817b may be able to access the account for user computer A 1817a only during regular business hours only and may be blocked from accessing the account outside of that window of time. Additionally or alternatively, the hooked permission management method 1831 may add or restrict access to information located within the shared folder 1833.

It should be noted that additional or alternative methods (besides the hooked permission management method 1831, for example) may be hooked. For example, one or more other methods may be hooked that may enable sending emails, filtering recipient lists, blocking sending and/or adding one or more other accounts to the recipient list, etc. It should also be noted that while the systems and methods disclosed herein may be applied to Microsoft Exchange as an example, the systems and methods disclosed herein may be applicable to a wide variety of applications (using .NET, for instance).

Figure 19:
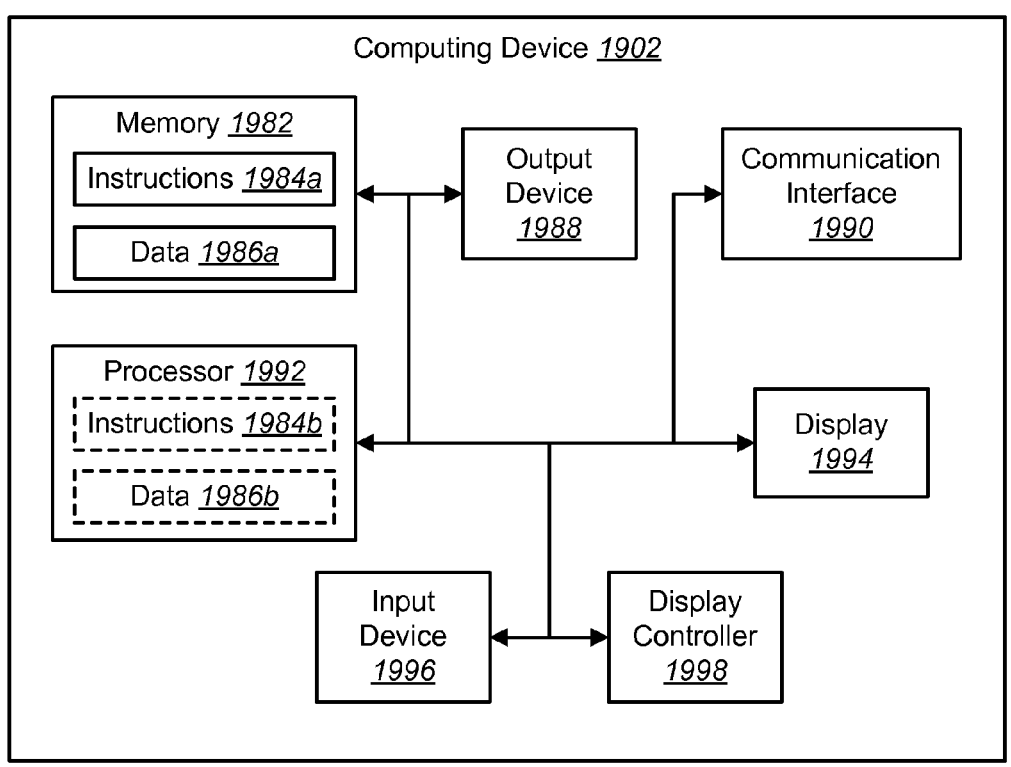
FIG. 19 is a block diagram illustrating components that may be utilized by a computing device.

FIG. 19 is a block diagram illustrating components that may be utilized by a computing device 1902. The computing device 1902 may be configured in accordance with one or more of the computing devices 102 described herein.

The computing device 1902 may communicate with other electronic devices through one or more communication interfaces 1990. Communication through the communication interface 1990 may be achieved through different methods such as wired communication, wireless communication or both wired and wireless communication. For example, the communication interface 1990 may be a serial port, a parallel port, a Universal Serial Bus (USB), an Ethernet adapter, an IEEE bus interface, a small computer system interface (SCSI) bus interface, an infrared (IR) communication port, a Bluetooth wireless communication adapter and so forth.

The computing device 1902 may receive and transmit information through one or more input devices 1996 and one or more output devices 1988. The input devices 1996 may be a keyboard, mouse, microphone, remote control device, button, joystick, trackball, touchpad, lightpen, etc. The output devices 1988 may be a speaker, printer, etc. A display device 1994 is an output device that may be included in a computer system. Display devices 1994 may project information through different technologies, such as liquid crystal display (LCD), light-emitting diode (LED), gas plasma, electroluminescence, a cathode ray tube (CRT) or the like.

A processor 1992 controls the operation of the computing device 1902 and may be a microprocessor, a microcontroller, a digital signal processor (DSP) or other device known in the art. A memory 1982 may be included in the computing device 1902 and includes instructions 1984a and data 1986a to assist the processor 1992 in operating the computing device 1902. The memory 1982 may send program instructions 1984b and/or data 1986b to the processor 1992 in order for the processor to perform logical and arithmetic operations according to methods disclosed herein. The processor may execute one or more of the instructions stored in the memory to implement one or more of the systems and methods disclosed herein.

Data 1986a stored in the memory 1982 may be converted to text, graphics and/or moving images (as appropriate) by a display controller 1998. Of course, FIG. 19 illustrates only one possible configuration of a computing device 1902. Various other architectures and components may be utilized.

In this application, various terms have been connected to reference numbers. The reference numbers are for an element in the one or more Figures. If a term is not connected to a reference number, the term is meant more generally and without limitation to any particular Figure.

In this application, the term "determining" has been used. The term "determining" is meant to cover several different actions and, therefore, some examples of "determining" are computing, calculating, processing, investigating, looking up (e.g., looking up in a table, a database or another data structure), ascertaining and the like. The term "determining" also covers resolving, selecting, choosing, establishing and the like. The term "determining" can also cover receiving information or accessing information.

In this application, the term "based on" means more than "based only on," except where expressly stated. The term "based on" describes both "based only on" and "based at least on."

In this application, the term "processor" is meant to be broadly interpreted and covers a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may also be a combination of several processing devices, e.g., a combination of a DSP and a microprocessor, a plurality of microprocessors, one or more microprocessors in conjunction with a DSP core, or any other such configuration.

In this application, the term "memory" is meant to be broadly interpreted and covers electronic storage devices capable of storing information electronically. The term "memory" covers various types of memory technology such as programmable read-only memory (PROM), random access memory (RAM), read-only memory (ROM); erasable programmable read only memory (EPROM), non-volatile random access memory (NVRAM), electrically erasable PROM (EEPROM), flash memory, magnetic or optical data storage, registers, etc. A processor and memory are in electronic communication, where the processor can read or write information located within the memory. Memory that is integral to a processor is in electronic communication with the processor.

In this application, the terms "instructions" and "code" are meant to be broadly interpreted and cover code or statements that are computer-readable. For example, the terms "instructions" and "code" may cover programs, routines, sub-routines, functions, procedures, etc. of assembly language code or intermediate language code.

In this application, the term "computer-readable medium" covers any available medium that a computer or processor can access. For example, a computer-readable medium may comprise optical disk storage such as RAM, ROM, EEPROM, CD-ROM, any magnetic disk storage devices, or any other medium for carrying or storing instructions and code that can be accessed by a computer or processor. A computer-readable medium may be non-transitory and tangible. The terms "disk" and "disc" cover compact disc (CD), laser disc, optical disc, digital versatile disc (DVD), floppy disk and Blu-ray® disc disks typically are used for data magnetically accessible, and discs typically are used for data optically accessible through lasers.

Instructions and code may be transmitted over a transmission medium. Instructions and code may also be called software. For example, software may be transmitted from a website, server, or other remote source. The transmission medium may be a coaxial cable, fiber optic cable, twisted pair, digital subscriber line (DSL), or wireless technologies such as infrared, radio, and microwave.

In this application, the methods comprise steps or actions for achieving the functions and processes described above. The method steps are to be understood as interchangeable with one another. The interchanging of a step is not to be understood as departing from the scope of the claims. In this application, the order of steps and actions may be modified and not depart from the scope of the claims, unless a specific order is stated for the steps or actions being described.

The claims are to be understood to not be limited to the exact configuration and components discussed above. The claims are to be understood to cover any reasonable modifications, changes and variations of the arrangement, operation and details of the systems, methods, and apparatus described herein.

What is claimed is:

1. A computing device configured for replacing a target method in intermediate language code, comprising:
   a processor;
   a memory in electronic communication with the processor;
   instructions stored in the memory, the instructions being executable to:
   import a hook method and hook type into a caller module;
   obtain a hook method token in the caller module, wherein a token is an integer number that describes a managed function, a managed property, or a managed instance;
   replace, in intermediate language code, any call to the target method in a caller method body with a call to the hook method to generate modified intermediate language code, wherein replacing a call to the target method in a caller method body with a call to the hook method comprises substituting a target method token with the hook method token;

compile the modified intermediate language code to assembly language code, wherein compiling the modified intermediate language code comprises recompiling the modified intermediate language code by a just-in-time (JIT) compiler; and call the hook method in place of the target method.

2. The computing device of claim 1, wherein the hook method calls the target method.

3. The computing device of claim 1, wherein the instructions are further executable to obtain a caller method type token, a target method type token and a hook method type token.

4. The computing device of claim 1, wherein the intermediate language code originates from a Microsoft.NET managed environment.

5. The computing device of claim 1, wherein the target method is a Microsoft Exchange method.

6. The computing device of claim 1, wherein the instructions are further executable to:

obtain a caller type from a current assembly using reflection when the caller type is null;

obtain a target type from the current assembly using reflection when the target type is null;

obtain the caller method using reflection when the caller type is not null and the caller method is null; and obtain the target method using reflection when the target type is not null and the target method is not null.

7. The computing device of claim 1, wherein the instructions are further executable to:

determine whether a target method return type and a hook method return type are compatible;

determine whether the target method is static; and determine whether target method parameters and hook method parameters are compatible.

8. A method for replacing a target method in intermediate language code, comprising:

importing a hook method and hook type into a caller module;

obtaining a hook method token in the caller module, wherein a token is an integer number that describes a managed function, a managed property, or a managed instance;

replacing, in intermediate language code, any call to the target method in a caller method body with a call to the hook method to generate modified intermediate language code, wherein replacing a call to the target method in a caller method body with a call to the hook method comprises substituting a target method token with the hook method token;

compiling the modified intermediate language code to assembly language code, wherein compiling the modified intermediate language code comprises recompiling the modified intermediate language code by a just-in-time (JIT) compiler; and calling the hook method in place of the target method.

9. The method of claim 8, wherein the hook method calls the target method.

10. The method of claim 8, wherein the method further comprises obtaining a caller method type token, a target method type token and a hook method type token.

11. The method of claim 8, wherein the intermediate language code originates from a Microsoft.NET managed environment.

12. The method of claim 8, wherein the target method is a Microsoft Exchange method.

13. A non-transitory, tangible computer-readable medium for replacing a target method in intermediate language code, comprising executable instructions for:

importing a hook method and hook type into a caller module;

obtaining a hook method token in the caller module, wherein a token is an integer number that describes a managed function, a managed property, or a managed instance;

replacing, in intermediate language code, any call to the target method in a caller method body with a call to the hook method to generate modified intermediate language code, wherein replacing a call to the target method in a caller method body with a call to the hook method comprises substituting a target method token with the hook method token;

compiling the modified intermediate language code to assembly language code, wherein compiling the modified intermediate language code comprises recompiling the modified intermediate language code by a just-in-time (JIT) compiler; and calling the hook method in place of the target method.

14. The computer-readable medium of claim 13, wherein the hook method calls the target method.

15. The computer-readable medium of claim 13, wherein the instructions are further executable for obtaining a caller method type token, a target method type token and a hook method type token.

16. The computer-readable medium of claim 13, wherein the intermediate language code originates from a Microsoft-.NET managed environment.

* * * * *